US012571813B2

(12) United States Patent　　　　　(10) Patent No.:　US 12,571,813 B2

Thomas　　　　　　　　　　　　　　(45) Date of Patent:　　Mar. 10, 2026

(54) METHOD OF WASHING A FLUIDIC SYSTEM OF AN IN-VITRO DIAGNOSTIC ANALYZER

(71) Applicant: Roche Diagnostics Operations, Inc., Indianapolis, IN (US)

(72) Inventor: Martin Thomas, Zug (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 134 days.

(21) Appl. No.: 18/544,389

(22) Filed: Dec. 18, 2023

(65) Prior Publication Data

US 2024/0201217 A1　　Jun. 20, 2024

(30) Foreign Application Priority Data

Dec. 19, 2022　(EP) ..................................... 22214420

(51) Int. Cl.
　*G01N 35/10*　　　(2006.01)
　*B08B 9/032*　　　(2006.01)
　*G01N 35/00*　　　(2006.01)
(52) U.S. Cl.
　CPC ....... G01N 35/1004 (2013.01); B08B 9/0325 (2013.01); B08B 9/0328 (2013.01); G01N 35/00584 (2013.01); *B08B 2209/032* (2013.01)
(58) Field of Classification Search
　CPC .......... G01N 35/1004; G01N 35/00584; B08B 9/0325; B08B 9/0328; B08B 2209/032
　See application file for complete search history.

(56) References Cited

U.S. PATENT DOCUMENTS

| | | | |
|---|---|---|---|
| 2006/0258011 A1 | 11/2006 | Shvets et al. | |
| 2021/0033583 A1* | 2/2021 | Shaw ..................... | B01D 53/26 |
| 2023/0309870 A1* | 10/2023 | Thomas ............. | A61B 5/14546 |
| | | | 600/365 |

FOREIGN PATENT DOCUMENTS

EP　　　　0720747 B1　　7/2002

OTHER PUBLICATIONS

Extended European Search Report, European Patent Office, European Patent Application No. 22214420.6, Jun. 23, 2023, 9 pages.

* cited by examiner

*Primary Examiner* — Sharidan Carrillo

(74) *Attorney, Agent, or Firm* — Taft Stettinius & Hollister LLP

(57)　　　　ABSTRACT

An automated method of washing a fluidic system 210 of an IVD analyzer 200 from a previous fluid is disclosed, the fluidic system 210 comprising at least one fluidic path 211, 213, 215. The method comprises controlling by a controller 250 a pump 240 and at least one fluid-selection valve 230 for pumping a wash fluid 221 and/or air 232 through the at least one fluidic path, wherein in a time-priority mode 10 the method comprises pumping at higher speed air, in a first step 11, in order to remove the previous fluid from the at least one fluidic path, and wash-fluid plugs alternated to air plugs, in a second step 12, in order to wash out residuals of the previous fluid, and wherein in a wash-fluid-priority mode 20 the controller 250 is configured to operate according to either a sample-wash mode 30 if the previous fluid is a sample 2 or according to an other-fluid-wash mode 40 if the previous fluid is any fluid other than a sample 2, wherein in the sample-wash mode 30 the method comprises pumping air at lower speed, in a first step 31, in order to remove the previous fluid from the at least one fluidic path, pumping at least one wash-fluid plug at higher speed, in a second step 32, and pumping wash-fluid plugs alternated to air plugs at lower speed, in a third step 33, in order to wash out residuals of the previous fluid, and wherein in the other-fluid-wash mode 40 the method comprises pumping air at lower speed, in a first step 41, in order to remove the previous fluid from the at least one fluidic path and pumping wash-fluid plugs alternated to air plugs at lower speed, in a second step 42, in order to wash out residuals of the previous fluid.

6 Claims, 6 Drawing Sheets

32

30

20

Alternate between fluidic paths 211, 213, 215 y times, y larger 33, 42 yes          Higher wash          no
Fluidic path 211    requirement?    Fluidic path 213, 215 y times, y smaller 33, 42

10, 12          10, 20?          20, 33 or 42
               12, 33, 42?

Pump a larger z number of wash-fluid plugs alternated to air plugs at higher speed Pump a smaller z number of wash-fluid plugs alternated to air plugs at lower speed

METHOD OF WASHING A FLUIDIC SYSTEM OF AN IN-VITRO DIAGNOSTIC ANALYZER

CROSS-REFERENCE TO RELATED APPLICATIONS

This application claims priority to European Patent Application No. 22214420.6 filed on Dec. 19, 2022, the contents of which are incorporated herein by reference in their entireties.

FIELD OF THE INVENTION

The present invention refers to an automated method of washing a fluidic system of an in-vitro diagnostic analyzer from a previous fluid, as well as to a respective in-vitro diagnostic analyzer.

BACKGROUND

In medicine, doctor's diagnosis and patient treatment often relies on the measurement of patient sample parameters carried out by in-vitro diagnostic analyzers. It is important that the analyzers perform correctly by providing precise and reliable measurements. Thus, it is a general requirement for in-vitro diagnostic analyzers to implement workflows that ensure analytical performance.

Some in-vitro diagnostic analyzers comprise a fluidic system, comprising reusable flow-through detecting units, by which different samples are repeatedly introduced and analyzed. The analytical workflows typically include the use of additional fluids as well, which are sequentially introduced in the fluidic system. Maintaining a clean fluidic system by washing the fluidic system after each analysis and before a new sample or a new fluid is introduced is important in order to prevent carryover and obtain valid measurement results. The consumption of wash fluids is however also an important aspect to be considered. It is often the case, e.g. due to the sensitivity of the detecting unit and/or due to environmental or disposal issues and/or costs, that aggressive wash fluids, which would be more efficient and require smaller volumes, may not be used. Washing is therefore typically based on subsequent dilution by replacing the previous fluid in a fluidic system with a milder wash fluid used in larger volumes and requiring longer times. It is however often the case that space availability for extra volumes of wash fluid and for waste of the used wash fluid is limited, thus requiring frequent replacement of consumables and generating large disposal volumes and costs. Also, the longer times required for washing increase the turnaround time, that is the time between two consecutive sample analyses or time until the analyzer is ready for introducing a new sample for analysis.

GENERAL DESCRIPTION

It is against the above background that aspects of the present disclosure provide certain unobvious advantages and advancements over the prior art. In particular, a new automated method of washing a fluidic system of an in-vitro diagnostic analyzer from a previous fluid is herein disclosed that is dynamically adapted according to different conditions and therefore enables the use of smaller volumes of wash fluid while maximizing washing efficiency within the time available.

In particular, an automated method of washing a fluidic system of an in-vitro diagnostic (IVD) analyzer from a previous fluid is herein disclosed, the fluidic system comprising at least one fluidic path, the IVD analyzer further comprising at least one fluid-selection valve for selecting between fluids including a wash fluid and air, a pump and a controller configured to operate according to either a time-priority mode or a wash-fluid-priority mode. The method comprises controlling by the controller the pump and the at least one fluid-selection valve for pumping the wash fluid and/or air through the at least one fluidic path. In the time-priority mode, the method comprises pumping at higher speed air, in a first step, in order to remove the previous fluid from the at least one fluidic path and wash-fluid plugs alternated to air plugs, in a second step, in order to wash out residuals of the previous fluid. In the wash-fluid-priority mode, the controller is configured to operate according to either a sample-wash mode if the previous fluid is a sample or according to an other-fluid-wash mode if the previous fluid is any fluid other than a sample. In the sample-wash mode, the method comprises pumping air at lower speed, in a first step, in order to remove the previous fluid from the at least one fluidic path, pumping at least one wash-fluid plug at higher speed, in a second step, and pumping wash-fluid plugs alternated to air plugs at lower speed, in a third step, in order to wash out residuals of the previous fluid. In the other-fluid-wash mode, the method comprises pumping air at lower speed, in a first step, in order to remove the previous fluid from the at least one fluidic path and pumping wash-fluid plugs alternated to air plugs at lower speed, in a second step, in order to wash out residuals of the previous fluid.

An in-vitro diagnostic analyzer configured to execute said automated method and presenting the same advantages is herein also disclosed.

The term "in-vitro diagnostic analyzer" or "IVD analyzer" as used herein refers to an automated or semi-automated analytical apparatus configured to analyze samples in vitro in order to provide information for screening, diagnosis or treatment monitoring purposes. The IVD analyzer can be designed and configured according to the medical area of application, the parameters to be determined and corresponding laboratory workflows. For example, in a point-of-care testing environment, IVD analyzers can vary from handheld devices with low throughput, short turn-around time and limited number of measurable parameters to compact benchtop instruments with higher throughput and higher number of measureable parameters. Such IVD analyzers are designed to detect certain types of parameters, e.g. gases, electrolytes, metabolites, clinical chemistry analytes, immunochemistry analytes, coagulation parameters, hematology parameters, etc. Depending on the parameters of interest, a variety of different analytical methods and different detection technologies can be applied. For example, in the field of blood gas and electrolyte testing, electrochemical measuring principles and/or conductivity measuring principles and/or optical detection methods are used. An IVD analyzer typically comprises a plurality of functional units, each dedicated to a specific task and cooperating with each other in order to enable automated sample processing and analysis. Such functional units may include e.g. a sample input interface for receiving a sample, a fluidic system, an analytical measurement unit or detecting unit, a fluid-supply unit, and the like. One or more functional units may be integrated into a larger unit or module in order to simplify the operation of the IVD analyzer.

In particular, the IVD analyzer of the present disclosure comprises at least one fluidic path, at least one fluid-selection valve for selecting between fluids including a wash fluid and air and possibly other valves. The IVD analyzer further comprises a fluid-supply unit comprising at least one wash fluid, and typically also other fluids, a pump and a controller configured to control the pump and the fluid-selection valve for transporting fluids through the at least one fluidic path and executing the method steps herein disclosed.

A "fluidic path" is part of a larger fluidic system that can include one or more hollow conduits such as a tubing, a channel, a chamber or combinations thereof, comprising one or more parts, suitable for the passage of fluids in at least a liquid tight manner, and which can have any shape and size, but which is typically optimized to minimize internal volumes and dead volumes. The parts may be flexible, rigid or elastic or combinations thereof. The one or more fluidic lines can be connected or connectable at least in part to each other, e.g. via fluidic connection and/or valves. The fluidic system and/or the at least one fluidic path within the fluidic system can include at least one flow-through detecting unit.

A "flow-through detecting unit" according to the present disclosure can be an analytical measurement unit of the IVD analyzer comprising at least one flow-through sensor path and/or at least one flow-through optical path.

A "flow-through sensor path" is a fluidic conduit that may comprise one or more sensors that a sample flowing through the sensor path comes in contact with, e.g. arranged sequentially along the path, e.g. a sensor for each different parameter/analyte to be detected, and may be embodied in a replaceable cartridge-like structure comprising a plurality of sensors, possibly distributed across a plurality of sensor paths. In alternative, the IVD analyzer may comprise a plurality of detecting units, each having a sensor path comprising a sensor dedicated to one parameter/analyte, and which may also be replaceable or not. A sample may thus flow into the one or more sensor paths and different parameters/analytes may be determined by respective sensors. The flow-through sensor path may be an integrated part of the fluidic system of the IVD analyzer or part of a separate component such as for example a sensor cartridge fluidically connected to the fluidic system of the IVD analyzer, in a way that the at least one fluidic line and the at least one sensor path are fluidically connected. The term "sensor" is herein generically used to indicate a detector configured to detect sample parameters by generating a correlated signal output that can be quantified and digitized. The sensor can be e.g. a biosensor, a chemical sensor or a physical sensor and is typically a part of a functional unit of an IVD analyzer, e.g. an analytical measurement unit or detecting unit. The sensor can be selective or specific with respect to one sample parameter of interest or can be configured to detect and quantify a plurality of different sample parameters of interest. Depending on the type of sensor, a sensor can comprise a plurality of sensory elements. The term "sensory element" therefore refers to a part of a sensor (e.g. to a working electrode, a reference electrode, a counter electrode) that in combination with one or more other sensory elements forms a fully functional sensor. According to an embodiment, the detecting unit comprises any one or more of a $pO_2$ sensor, a $pCO_2$ sensor, a pH sensor, one or more ion selective electrode (ISE) sensors for determining electrolyte values such as $Na^+$, $K^+$, $Ca_2^+$ and $Cl^-$, one or more metabolite sensors for determining parameters such as lactate and glucose. The sensors may be e.g. respectively based on the amperometric, potentiometric or conductometric principle.

A "flow-through optical path" is a fluidic conduit, chamber or the like, embodied e.g. at least in part as a cuvette, with parallel walls at a predetermined distance from each other, arranged such as to be illuminated at least in part by a light source and to transmit light to optical measurement unit, such as a photodetector, optical camera or the like, e.g. configured to measure the absorption or transmission of light through a sample located in the optical path.

The term "fluid-selection valve" refers to a flow-regulating device to control, redirect, restrict or stop flow and, in particular, to a switching or rotary valve, that is a multi-port valve that enables to select fluidic connections. This is typically achieved by moving one or more valve conduits to switch communication between different elements. Elements may be fluidically connected via further conduits, like pipes, tubes, capillaries, microfluidic channels and the like. For example, the valve may be integrated into a manifold comprising a channel and a respective input port for each fluid reservoir, where upon switching, e.g. by rotation, of the valve a fluidic connection is established between one fluidic reservoir at a time and e.g. a common outlet port connected or connectable to the fluidic line leading to the flow-through sensor path. Alternatively, the manifold may comprise an input port for each fluid reservoir all leading to a common channel and to a common fluid input port of the fluid-selection valve, in which case an individual on/off valve may be arranged in correspondence to each fluid reservoir or fluid input port for allowing selected fluids from selected fluid reservoirs to flow into the common channel and to the fluid-selection valve. The valve may comprise other input ports for other fluids like for ambient air and/or for samples.

The IVD analyzer also comprises at least one pump, e.g. a peristaltic pump, syringe pump, membrane pump or any other suitable pump, for transporting e.g. samples from sample containers, wash fluid and possibly other fluids from the fluid-supply unit, or ambient air through the at least one fluidic path and through the detecting unit. The pump is typically positioned downstream of the detecting unit but it may be located at any other position and may be connected to the fluidic system via further elements such as valves and switches. Also, the pumping direction can be invertible.

A "fluid-supply unit" as used herein is a module or component of the IVD analyzer comprising one or more fluid reservoirs, and possibly also one or more waste containers where fluids circulated through the fluidic system may be disposed of at the end of the process. The term "fluid" may refer to either a gas or liquid or mixtures thereof. A fluid may be for example a sample, a reagent, a reference fluid such as a quality control fluid or a calibration fluid, a wash fluid, a wetting fluid, air or other gas. According to some embodiments a fluid can have different functions, e.g. the wash fluid can have also one or more other functions besides the washing function. Also, a fluid of the fluid supply-unit possibly having a function different than a washing function as main function could be used also as a wash fluid according to some embodiments. Thus, the term "wash fluid" is not limited to the content or properties of the fluid itself in order to exercise its function as a wash fluid, but to its use as a wash fluid for washing the at least one fluidic path according to the method disclosed herein.

The term "sample" refers to a biological material potentially containing one or more analytes of interest and whose detection or analysis, qualitative and/or quantitative, may be associated to a clinical condition. The sample can be derived from any biological source, such as a physiological fluid, including blood, saliva, ocular lens fluid, cerebral spinal fluid, sweat, urine, milk, ascites fluid, mucous, synovial fluid, peritoneal fluid, amniotic fluid, tissue, cells or the like. The test sample can be pretreated prior to use, such as preparing plasma or serum from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g. after adding an internal standard, after being diluted with another solution or after having being mixed with reagents e.g. to enable carrying out one or more in vitro diagnostic tests, or for enriching (extracting/separating/concentrating) analytes of interest and/or for removing matrix components potentially interfering with the detection of the analyte(s) of interest.

According to one aspect, the sample is blood or a blood derivative such as plasma or serum.

A sample, especially if blood but not only, can be characterized by elevated particle content, such as cells, including skin cells, clots, protein clumps, sample treatment materials such as gels and the like, that may leave sticky residuals in the at least one fluidic path.

According to certain aspects, analytes of interest are gases, such as $O_2$ and $CO_2$, blood electrolytes such as Sodium ($Na^+$), Potassium ($K^+$), Chloride ($Cl^-$), Calcium ($Ca^{++}$), protons ($H^+$) in relation to pH, metabolites such as Glucose and Lactate, drugs of abuse, therapeutic drugs, hormones, markers, proteins and the like. Other analytes of interest are hemoglobin, hemoglobin derivatives such as Deoxygenated hemoglobin, Oxyhemoglobin, Carboxyhemoglobin, Methemoglobin, bilirubin, Urea, Creatinine. The list is however not exhaustive.

Samples are typically entered into the fluidic system via a sample input interface, different from the fluid-supply unit, that is another module or component of an in-vitro diagnostic analyzer typically arranged at a position conveniently accessible by an operator and configured to transfer a sample from a sample container brought up by the operator into the in-vitro diagnostic analyzer. The sample input interface may e.g. comprise a sample input port comprising an outer input-port side configured for coupling, attaching, connecting, sitting, introducing or plugging-in a sample container, e.g. of the capillary-type or syringe-type, and an inner input-port side coupled to or for coupling to one end of a sample-input conduit, the sample input conduit being for example fluidically connected or connectable at the other end to the detecting unit/sensor path directly or via the fluid-selection valve.

According to one embodiment the sample-input conduit is the same fluidic line leading from the fluid-selection valve to the sensor path and configured to alternately connect with the same end to the inner input port side and to the fluid-selection valve, e.g. directly to the outlet port of the fluid-selection valve, or to a further port connected to the outlet port of the fluid-selection valve via a further conduit, in order to alternately draw a sample from the sample input port and a fluid other than a sample through the fluid-selection valve, whereas the other end is connected to the detecting unit/sensor path. According to an embodiment the fluidic line, if acting also as sample input-conduit, may be embodied at least in part as a rigid aspiration needle configured to be coupled to the inner input-port side of the sample input port and to the outlet port of the fluid selection-valve or extension thereof. According to an embodiment ambient air can also be aspirated via the sample input port directly into the fluidic line or via a dedicated air port of the fluid-selection valve.

A "fluid other than a sample" can in principle be any fluid used by the IVD analyzer that is different from a sample to be analyzed, such as e.g. a reagent, a reference fluid such as a quality control fluid or a calibration fluid, a wetting fluid, typically in liquid form.

The term "controller" as used herein may include any physical or virtual processing device and in particular a programmable logic controller running a computer-readable program provided with instructions to perform operations in accordance with an operation plan and in particular in accordance with the method of washing a fluidic system of an IVD analyzer as herein disclosed. This may include a processor, a controller, a central processing unit (CPU), a microprocessor, a microcontroller, a reduced instruction circuit (RISC), an application-specific integrated circuit (ASIC), a logic circuit, or any other circuit or processor configured to execute one or more of the functions/methods described herein. In particular, the controller, among other possible configurations and functions, is configured to control the pump and the at least one fluid-selection valve for pumping the wash fluid and/or air through the at least one fluidic path.

In particular, the controller is configured to operate according to either a time-priority mode or a wash-fluid-priority mode.

The "time-priority mode" is a mode that priorities the time spent for washing versus the volume of wash fluid used. In other words, it is a mode that is aimed at minimizing the time duration of the washing procedure, while giving lower importance to the volume of wash-fluid being used.

In contrast, the "wash-fluid-priority mode" is a mode that prioritizes the volume of wash fluid used for washing versus the time spent for washing. In other words, it is a mode that is aimed at minimizing the use of wash fluid, while giving lower importance to the time duration of the washing procedure. It is thus a sort of "economical" mode.

However, both in the time-priority mode and the wash-fluid-priority mode the controller aims at achieving the same or comparable washing result or effect.

The time-priority mode and the wash-fluid-priority mode can be user-selectable or automatically selectable by the controller, e.g. based on a set of rules or criteria. For example, the time-priority mode can be automatically selected based on age or remaining lifetime of a consumable, e.g. of the detecting unit and/or of the wash fluid, or in high-throughput demands, whereas the wash-fluid-priority mode can be automatically selected in case of less frequent demands for sample analysis, or e.g. based on presence detection, e.g. by a movement sensor of the IVD analyzer, indicating e.g. the absence of personnel in the vicinity of the analyzer, presumably approaching the analyzer with a sample to be analyzed. Moreover, it may be possible to switch from a wash-fluid priority mode to a time-priority or vice-versa at any time, either manually or automatically.

In the time-priority mode, the method comprises pumping at higher speed air, in a first step, in order to remove the previous fluid from the at least one fluidic path and wash-fluid plugs alternated to air plugs, in a second step, in order to wash out residuals of the previous fluid. The time-priority mode is independent of the nature of the previous fluid to be washed out of the fluidic path, that can be either a sample or any fluid other than a sample.

The terms "higher speed" and "lower speed" with reference to the pumping speed are only relative terms used to compare different flow rates obtained by using the same pump, quantified e.g. in mL/min or μL/min or μL/s, for the same fluid(s) being pumped during different method steps respectively, one being higher and one being lower than the other respectively. This can include adjusting the speed of the pump by the controller (if the pump speed is adjustable) according to the particular method step to be respectively higher or lower, e.g. compared to the standard pump speed used to pump other fluids through the same fluidic path. According to an embodiment, the higher speed or higher flow rate is obtained at the highest pump speed that the pump is capable of. According to an embodiment, an even higher speed or even higher flow rate can be achieved as explained further below.

The pumping speed/flow rate can have additional effects on the efficiency of the washing procedure besides influencing the time of the washing procedure. In particular, at higher speed also higher shear forces are exerted, which can have the advantageous effect of more efficiently removing sticky residuals or particles in the fluidic path at the liquid/air interface, due to the density difference between the two mediums. So, if the main purpose is to remove particle residuals from a fluidic path, by using shear forces, higher speed/flow rate may be preferred. However, the pumping speed/flow rate has also an effect on the thickness of liquid film tailing along the walls of the fluidic path, the liquid film being thicker at higher speed and thinner at lower speed. Thus a lower speed/flow rate may be preferred in order to reduce carry over between wash-fluid plugs, thereby reducing the number of wash-fluid plugs necessary to achieve the same washing result, by consecutive dilution effect, and increasing the washing efficiency. In other words, at higher speed/flow rate more wash-fluid plugs and thus higher wash-fluid consumption, are required in order to achieve the same wash result, thus decreasing the washing efficiency. Also, at lower speed/flow rate, the surface tension of a liquid is stronger in relation to inertia forces, which means that less droplets are left behind in the fluidic path. Thus a lower speed/flow rate may be preferred in order to remove a previous fluid from the fluidic path if the fluid is particle-free and/or is a fluid other than a sample.

In particular, in the wash-fluid-priority mode, the controller is configured to operate according to either a sample-wash mode if the previous fluid is a sample or according to an other-fluid-wash mode if the previous fluid is any fluid other than a sample. In the sample-wash mode, the method comprises pumping air at lower speed, in a first step, in order to remove the previous fluid from the at least one fluidic path, pumping at least one wash-fluid plug at higher speed, in a second step, and pumping wash-fluid plugs alternated to air plugs at lower speed, in a third step, in order to wash out residuals of the previous fluid. In the other-fluid-wash mode, the method comprises pumping air at lower speed, in a first step, in order to remove the previous fluid from the at least one fluidic path and pumping wash-fluid plugs alternated to air plugs at lower speed, in a second step, in order to wash out residuals of the previous fluid.

With respect to the wash-fluid plugs, it is beneficial to use a volume of wash fluid that is as small as possible in order to reduce wash-fluid consumption. Also, when a wash-fluid plug is pumped at higher speed for exerting shear forces, given that the washing effect is obtained mainly at the air/liquid interface, larger volume (longer) plugs do not bring additional benefits. However, the volume has to be large enough such as to continue filling the entire cross-section of a fluidic path at any location during transport in the fluidic path. Also, when consecutive wash-fluid plugs are pumped at lower speed alternated to air plugs, for which the washing effect is mainly based on subsequent dilution of residuals of the previous fluid, it is more beneficial to have a larger number of wash-fluid plugs with smaller volume that a smaller number of wash-fluid plugs with larger volume.

With respect to the volume of the air plugs, it is beneficial to use a volume of air that is small enough in order to minimize oscillating effects due to compressibility of air, and that is large enough in order to keep consecutive wash-fluid plugs separated.

In any case, the minimum volume of a wash-fluid plug is limited by the dosing accuracy of the pump and the switching speed of the pump, as well as on the inner dimensions of the at least one fluidic path, such that a wash-fluid plug completely fills the cross section of the at least one fluidic path, and if the cross-section is variable along the fluidic path such that it completely fills the largest cross-section, when travelling through it at any speed. If a wash-fluid plug is not filling the entire cross-section of a fluidic path, it can slow down or even stop as it is overtaken by the following air plug allowing the next wash-fluid plug to catch up and eventually merge with each other. This would reduce the number of air/liquid interfaces and thereby the washing efficiency.

According to an embodiment, in the sample-wash mode the step of pumping the at least one wash-fluid plug at higher speed comprises switching the at least one fluid-selection valve in order to select the wash fluid, operating the pump to draw a volume of wash fluid corresponding to a wash-fluid plug into the fluidic system, closing the fluid-selection valve and operating the pump in order to generate an underpressure in the fluidic system before moving the wash-fluid-plug, and switching the fluid-selection valve to air in order to move the wash-fluid plug at higher speed facilitated by the underpressure. An even higher speed or higher flow rate than that which is obtained at the highest pump speed that the pump is capable of, can thereby be obtained.

According to an embodiment, the method comprises executing the same method step for each fluidic path to be washed one fluidic path at a time in alternate manner before initiating a different method step in the same fluidic path. In other words, if the fluidic system comprises a plurality of fluidic paths to be washed, the first method step is executed sequentially for all fluidic paths to be washed, one fluidic path after another, before the second method step is initiated and executed sequentially for all fluidic paths to be washed, one fluidic path after another, and so on.

According to an embodiment, in the sample-wash mode the method comprises repeating the step of pumping a single wash-fluid plug at higher speed a variable number x of times, where x is larger for samples with higher particle content, for example as determined by the flow-through detecting unit, e.g. based on hematocrit level determination, clot detection, high lipid content determination and the like, e.g. based on optical and/or impedance determination.

According to an embodiment, in the wash-fluid-priority mode the method comprises repeating the step of pumping wash-fluid plugs alternated to air plugs at lower speed for each fluidic path to be washed one fluidic path at a time in alternate manner a variable number y of times for different fluidic paths where y is larger for fluidic paths with higher wash requirement, e.g. larger for a fluidic path comprising a flow-through sensor path (due to its complex structure with sensory elements that may more easily retain residuals of a previous fluid) compared to a fluidic path comprising a flow-through optical path, and larger for a fluidic path comprising a flow-through optical path compared to a bypass fluidic path that bypasses any of the flow-through sensor path and flow-through optical path.

According to an embodiment, in the time-priority mode the method comprises pumping a larger number z of wash-fluid plugs alternated to air plugs than in the wash-fluid-priority mode.

According to an embodiment, the method comprises measuring and/or monitoring a wash result and adapting any one or more of the numbers x, y, z and/or the pump speed accordingly. The wash result can be measured and/or monitored, e.g. by analyzing the content of residuals of the previous fluid in the wash fluid by the at least one flow-through detecting unit during the wash procedure. Adapting any one or more of the numbers x, y, z may comprise increasing any of these numbers if the expected wash result has not been obtained or reducing any of these numbers, e.g. interrupting a respective method step as soon as the expected wash result has been obtained. Similarly, the pump speed may be increased or decreased depending on the circumstances.

According to an embodiment, the method comprises adapting any one or more of the numbers x, y, z and/or the pump speed in the sample-wash mode depending on the type of sample, e.g. depending on level of particle content when compared between different sample types, if that is known in advance based on the type of sample.

The present disclosure is also directed to an in-vitro diagnostic (IVD) analyzer comprising a fluidic system comprising at least one fluidic path, the IVD analyzer further comprising at least one fluid-selection valve for selecting between fluids including a wash fluid and air, a pump and a controller configured to wash the at least one fluidic path from a previous fluid by controlling the pump and the at least one fluid-selection valve for pumping the wash fluid and/or air through the at least one fluidic path. In particular, the controller is configured to operate according to either a time-priority mode or a wash-fluid-priority mode, where in the time-priority mode the controller is configured to pump at higher speed air, in a first step, in order to remove the previous fluid from the at least one fluidic path and wash-fluid plugs alternated to air plugs, in a second step, in order to wash out residuals of the previous fluid, and where in the wash-fluid-priority mode the controller is configured to operate according to a sample-wash mode if the previous fluid is a sample or according to an other-fluid-wash mode if the previous fluid is any fluid other than a sample. In particular, in the sample-wash mode the controller is configured to pump air at lower speed, in a first step, in order to remove the previous fluid from the at least one fluidic path, to pump at least one wash-fluid plug at higher speed, in a second step, and to pump wash-fluid plugs alternated to air plugs at lower speed, in a third step, in order to wash out residuals of the previous fluid, whereas in the other-fluid-wash mode the controller is configured to pump air at lower speed, in a first step, in order to remove the previous fluid from the at least one fluidic path and to pump wash-fluid plugs alternated to air plugs at lower speed, in a second step, in order to wash out residuals of the previous fluid.

According to an embodiment, in the sample-wash mode, the controller, in order to pump the at least one wash-fluid plug at higher speed, is configured to switch the at least one fluid-selection valve in order to select the wash fluid, to operate the pump to draw a volume of wash fluid corresponding to a wash-fluid plug into the fluidic system, to close the fluid-selection valve and to operate the pump in order to generate an underpressure in the fluidic system before moving the wash-fluid-plug, and to switch the fluid-selection valve to air in order to move the wash-fluid plug at higher speed facilitated by the underpressure.

According to an embodiment, the controller is configured to execute the same method step for each fluidic path to be washed one fluidic path at a time in alternate manner before initiating a different method step in the same fluidic path.

According to an embodiment, in the sample-wash mode, the controller is configured to repeat the step of pumping of single wash-fluid plugs at higher speed a variable number x of times, wherein x is larger for samples with higher particle content.

According to an embodiment, in the wash-fluid-priority mode, the controller is configured to repeat the step of pumping wash-fluid plugs alternated to air plugs at lower speed for each fluidic path to be washed one fluidic path at a time in alternate manner a variable number y of times for different fluidic paths wherein y is larger for fluidic paths with higher wash requirement.

According to an embodiment, in the time-priority mode, the controller is configured to pump a larger number z of wash-fluid plugs alternated to air plugs than in the wash-fluid-priority mode.

According to an embodiment, the controller, based on a measured and/or monitored wash result, is configured to adapt any one or more of the number x, y, z and/or the pump speed accordingly.

According to an embodiment, the controller is configured to adapt any one or more of the numbers x, y, z and/or the pump speed in the sample-wash mode depending on the type of sample, e.g. depending on level of particle content when compared between different sample types, if that is known in advance based on the type of sample.

Other and further objects, features and advantages will appear from the following description of exemplary aspects and accompanying drawings, which serve to explain the principles more in detail.

Skilled artisans appreciate that elements in the figures are illustrated for simplicity and clarity and have not necessarily been drawn to scale. For example, the dimensions of some of the elements in the figures may be exaggerated relative to other elements whereas other elements may have been left out or represented in a reduced number in order to enhance clarity and improve understanding of the aspects of the present disclosure.

DETAILED DESCRIPTION

Figure 1:
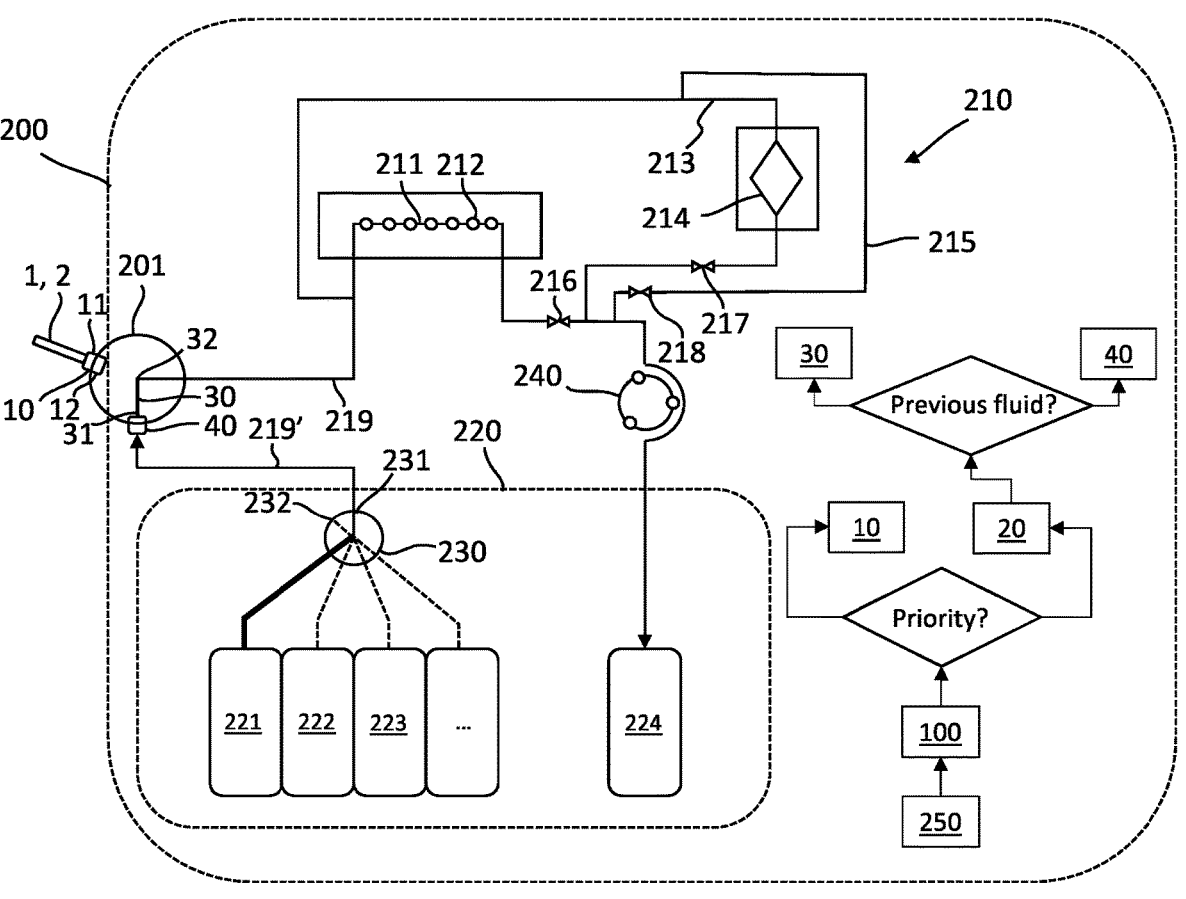
FIG. 1 shows schematically an IVD analyzer comprising a controller configured to execute a washing method.

FIG. 1 shows schematically an IVD analyzer 200 comprising a fluidic system 210. The fluidic system 210 comprises a plurality of fluidic paths 211, 213, 215 in this case. The fluidic path 211 is a flow-through sensor path comprising a plurality of sensors 212. The fluidic path 213 is a flow-through optical path comprising a flow-through optical detecting unit 214. The fluidic path 215 is a bypass fluidic path that bypasses any of the flow-through sensor path 211 and flow-through optical path 213. The IVD analyzer 200 further comprises a fluid-selection valve 230 for selecting between fluids 221, 222, 223, 232 including a wash fluid 221 and air 232, a pump 240 and a controller 250 configured to execute a method 100 of washing the fluidic system 210, including washing the at least one fluidic path 211, 213, 215 from a previous fluid, by controlling the pump 240 and the at least one fluid-selection valve 230 for pumping the wash fluid 221 and/or air 232 through the at least one fluidic path, 211, 213, 215. Selecting between any of the fluidic paths 211, 213, 215 can be achieved by controlling by the controller 250 also any one or more of respective fluidic path valves 216, 217, 218. For example, by switching the flow-through sensor path valve 216 on, while switching the flow-through optical path valve 217 and the bypass valve 218 off, a fluid can be pumped through the flow-through sensor path 211. By switching the flow-through optical path valve 217 on, while switching the flow-through sensor path valve 216 and the bypass valve 218 off, a fluid can be pumped through the flow-through optical path 213. By switching the bypass valve 218 on, while switching the flow-through sensor path valve 216 and the flow-through optical path valve 217 off, a fluid can be pumped through the bypass fluidic path 215. The IVD analyzer 200 further comprises a sample input interface 201, comprising a sample input port 10 comprising an outer input-port side 11 configured for plugging-in an open end of a sample container 1 and an inner input-port side 12. The sample container 1 is in this example a capillary-like sample container. The sample input interface 201 further comprises an aspiration needle 30 comprising an upstream end 31 and a downstream end 32. The downstream end 32 of the aspiration needle 30 is fluidically connected to the fluidic system 210 via fluidic line 219 whereas the upstream end 31 is configured to alternately couple to the inner input-port side 12 in order to aspirate a sample 2 from a sample container 1 plugged in the outer input-port side 11 and to a fluid-supply unit port 40 fluidically connected to a common outlet port 231 of the fluid-selection valve 230 via a further conduit 219'. The fluidic line 219 may be however directly connected to the outlet port 231 of the fluid-selection valve 230, whereas samples may be introduced via a different fluidic line separately connected to the fluid-selection valve 230, for example. The IVD analyzer 200 further comprises a fluid-supply unit 220 comprising a plurality of fluids 221, 222, 223, including the wash fluid 221, and a waste container 224 where fluids circulated through the fluidic system 210 may be disposed of, by the pumping action of the pump 240, such as a peristaltic pump, located downstream of the of the fluidic system 210.

More in particular, the controller 250 is configured to operate according to either a time-priority mode 10 or a wash-fluid-priority mode 20, where in the time-priority mode 10 the controller 250 is configured to pump at higher speed air 232, in a first step, in order to remove the previous fluid from the at least one fluidic path 211, 213, 215 and wash-fluid plugs alternated to air plugs, in a second step, in order to wash out residuals of the previous fluid, and where in the wash-fluid-priority mode 20 the controller 250 is configured to operate according to a sample-wash mode 30 if the previous fluid is a sample 2 or according to an other-fluid-wash mode 40 if the previous fluid is any fluid 222, 223 other than a sample 2, where in the sample-wash mode 30 the controller 250 is configured to pump air 232 at lower speed, in a first step, in order to remove the previous fluid from the at least one fluidic path 211, 213, 215, to pump at least one wash-fluid plug at higher speed, in a second step, and to pump wash-fluid plugs alternated to air plugs at lower speed, in a third step, in order to wash out residuals of the previous fluid, and where in the other-fluid-wash mode 40 the controller 250 is configured to pump air 232 at lower speed, in a first step, in order to remove the previous fluid from the at least one fluidic path and to pump wash-fluid plugs alternated to air plugs at lower speed, in a second step, in order to wash out residuals of the previous fluid.

Figure 2:
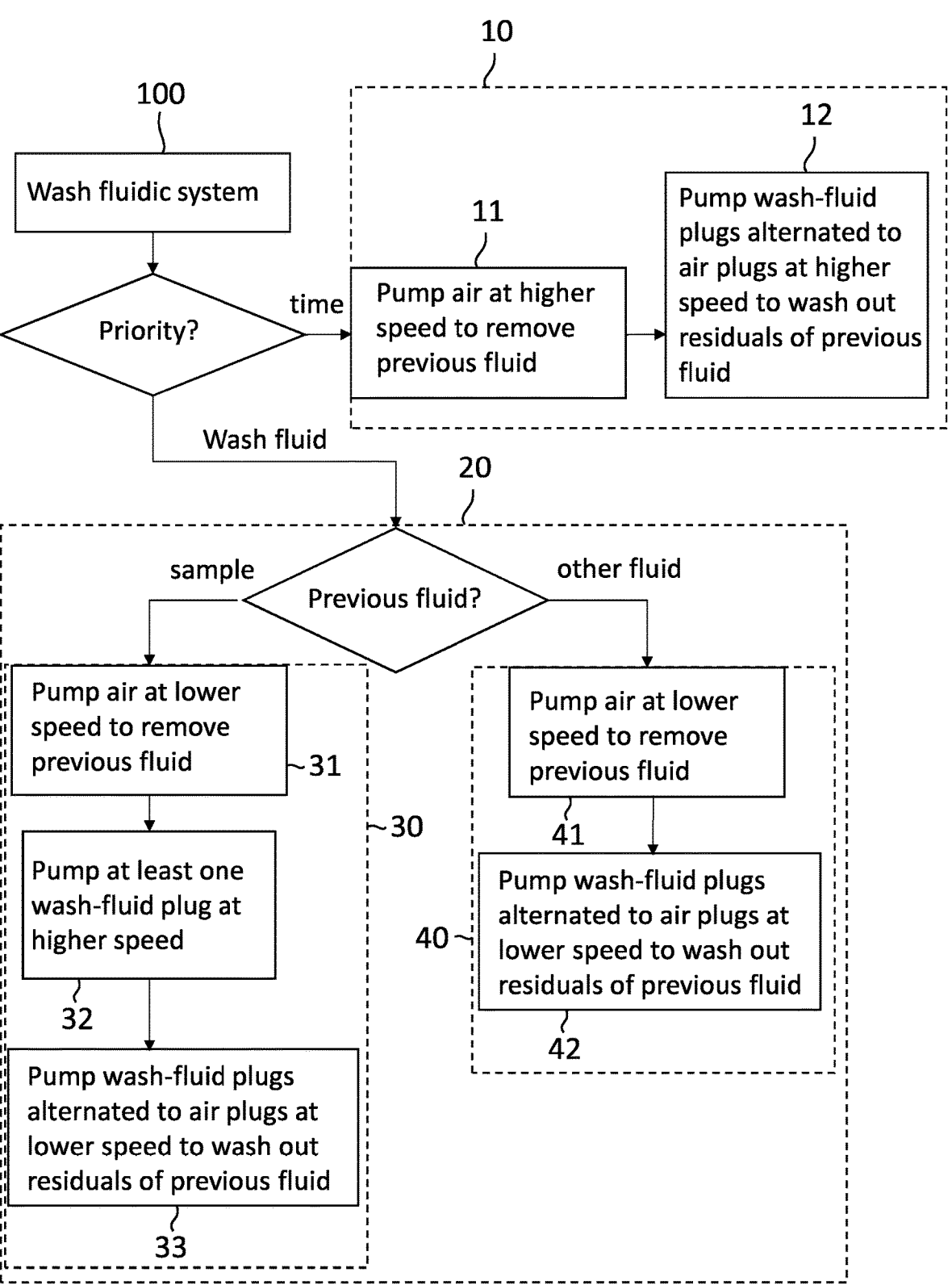
FIG. 2 is a flow diagram showing schematically an automated method of washing a fluidic system of an IVD analyzer from a previous fluid.

FIG. 2, to be looked in connection to FIG. 1, is a flow diagram showing schematically an automated method 100 of washing a fluidic system 210 of an IVD analyzer 200 like the one shown in FIG. 1 from a previous fluid, the fluidic system 210 (as shown in FIG. 1) comprising at least one fluidic path 211, 213, 215, the IVD analyzer 200 further comprising at least one fluid-selection valve 230 for selecting between fluids 221, 222, 223, 232 including a wash fluid 221 and air 232, a pump 240 and a controller 250 configured to operate according to either a time-priority mode 10 or a wash-fluid-priority mode 20, the method 100 comprising controlling by the controller 250 the pump 240 and the at least one fluid-selection valve 230 for pumping the wash fluid 221 and/or air 232 through the at least one fluidic path 211, 213, 215, where in the time-priority mode 10 the method comprises pumping at higher speed air, in a first step 11, in order to remove the previous fluid from the at least one fluidic path 211, 213, 215, and wash-fluid plugs alternated to air plugs, in a second step 12, in order to wash out residuals of the previous fluid, and where in the wash-fluid-priority mode 20 the controller 250 is configured to operate according to either a sample-wash mode 30 if the previous fluid is a sample 2 or according to an other-fluid-wash mode 40 if the previous fluid is any fluid other than a sample 2, where in the sample-wash mode 30 the method comprises pumping air at lower speed, in a first step 31, in order to remove the previous fluid from the at least one fluidic path, pumping at least one wash-fluid plug at higher speed, in a second step 32, and pumping wash-fluid plugs alternated to air plugs at lower speed, in a third step 33, in order to wash out residuals of the previous fluid, and where in the other-fluid-wash mode 40 the method comprises pumping air at lower speed, in a first step 41, in order to remove the previous fluid from the at least one fluidic path 211, 213, 215 and pumping wash-fluid plugs alternated to air plugs at lower speed, in a second step 42, in order to wash out residuals of the previous fluid.

Figure 3:
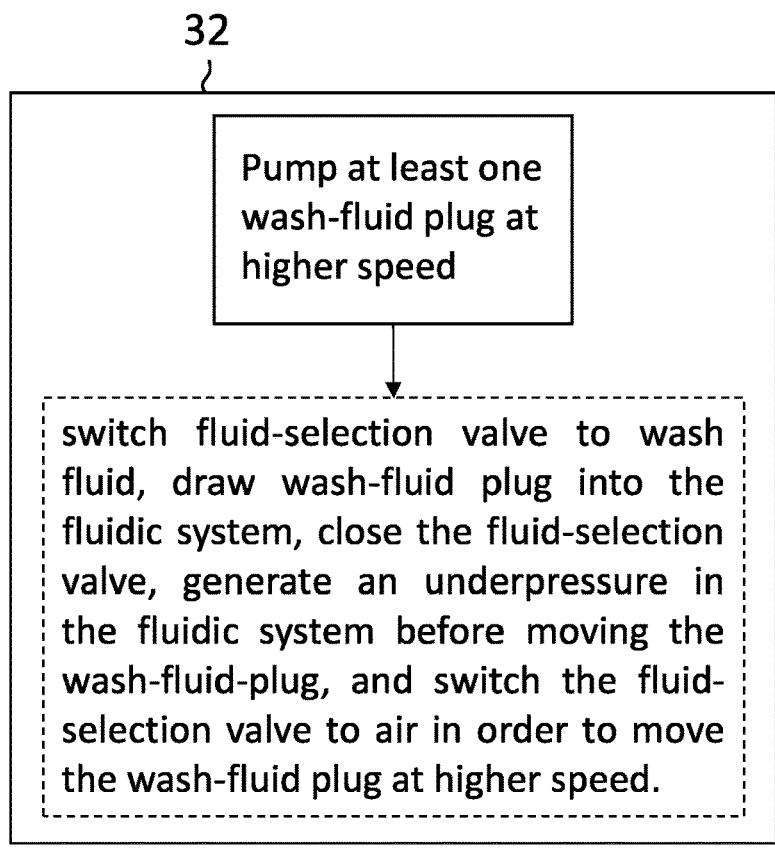
FIG. 3 shows schematically further aspects of one of the steps of the method of FIG. 2, in order to obtain higher speed.

FIG. 3, also to be looked in connection to FIG. 1, shows schematically further aspects of the second step 32 of the sample-wash mode 30 of the method 100 of FIG. 2. In particular, in the sample-wash mode 30, the second step 32 of pumping the at least one wash-fluid plug at higher speed comprises switching the at least one fluid-selection valve 230 in order to select the wash fluid 221, operating the pump 240 to draw a volume of wash fluid corresponding to a wash-fluid plug into the fluidic system 210, and in particular into the fluidic line 219', closing the fluid-selection valve 230 and operating the pump 240 in order to generate an underpressure in the fluidic system 210 before moving the wash-fluid-plug, and switching the fluid-selection valve 230 to air 232 in order to move the wash-fluid plug at higher speed facilitated by the underpressure.

Figure 4:
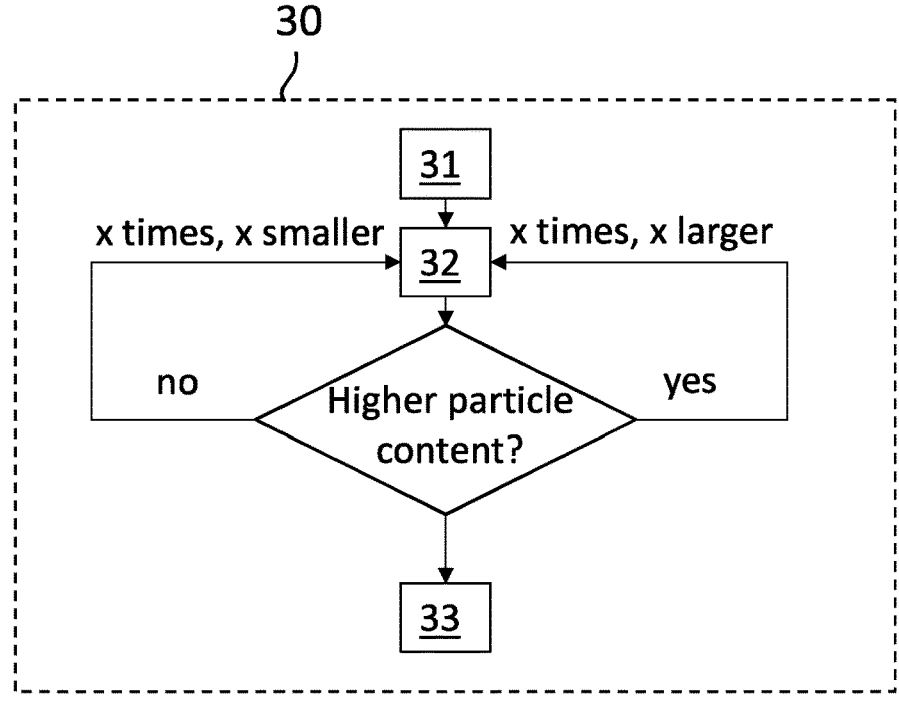
FIG. 4 shows schematically further aspects of one of the steps of the method of FIG. 2 that takes into account further characteristics of the previous fluid.

FIG. 4 shows schematically further aspects of the sample-wash mode 30 of the method of FIG. 2 that takes into account further characteristics of the previous fluid. In particular, in the sample-wash mode 30 the method 100 may comprise repeating the step 32 of pumping a single wash-fluid plug at higher speed a variable number x of times, where x is larger for samples with higher particle content.

Figure 5:
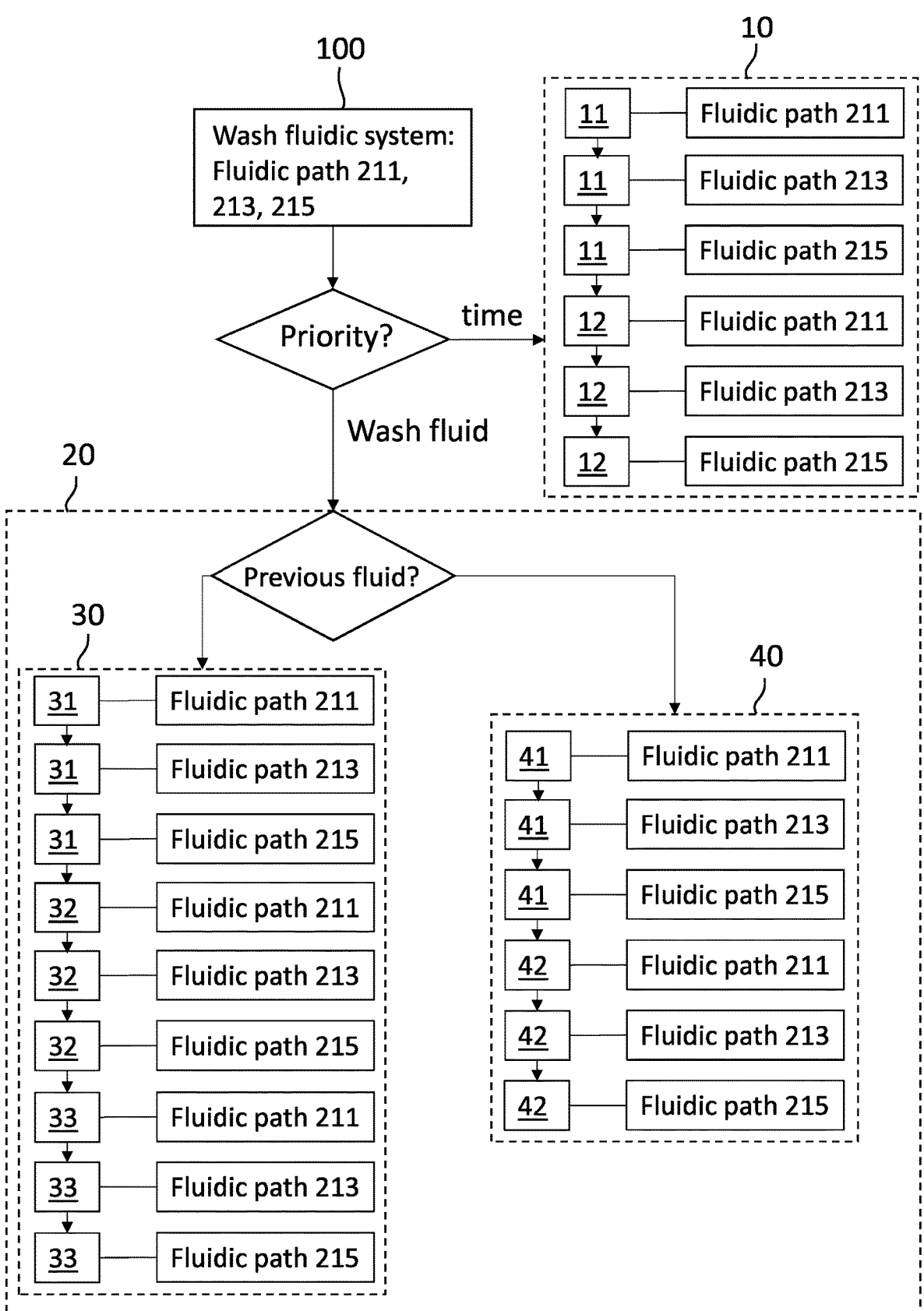
FIG. 5 shows schematically further aspects of the method of FIG. 2 in presence of a plurality of fluidic paths.

FIG. 5 shows schematically further aspects of the method of FIG. 2 in presence of a plurality of fluidic paths 211, 213, 215 (as shown e.g. in FIG. 1). In particular, the method 100, in any of the time-priority mode 10 and wash-fluid-priority mode 20, including the sample-wash mode 30 and the other-fluid-wash mode 40, comprises executing the same method step 11, 31, 41 for each fluidic path 211, 213, 215 to be washed one fluidic path 211, 213, 215 at a time in alternate manner before initiating a different method step 12, 32, 33, 42 in the same fluidic path 211, 213, 215.

Figures 6, 7:
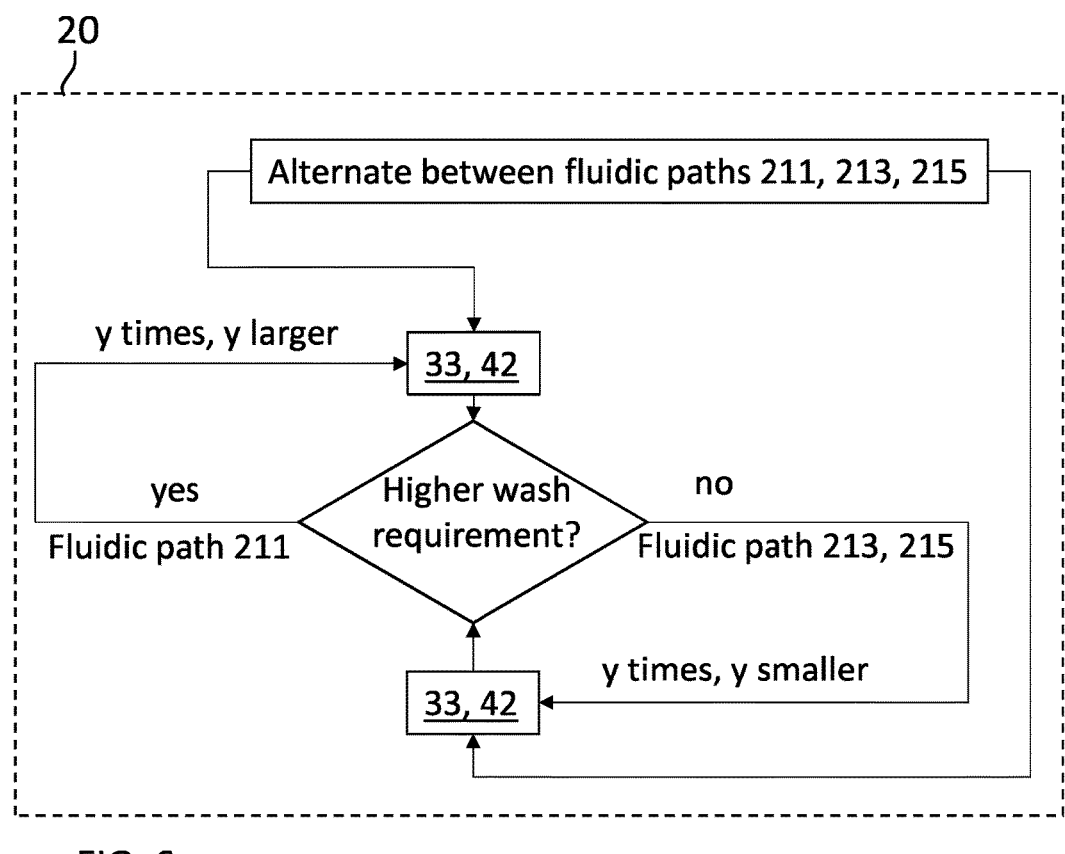
FIG. 6 shows schematically further aspects of the method of FIG. 2 that distinguish between different fluidic paths.
FIG. 7 shows schematically further aspects of the method of FIG. 2 that distinguish between different method steps.

FIG. 6 shows schematically further aspects of the method 100 of FIG. 2 that distinguish between different fluidic paths 211, 213, 215. In particular, in the wash-fluid-priority mode 20 the method 100 comprises repeating the step 33 in the sample-wash mode 30 or the step 42 in the other-fluid-wash mode 40 of pumping wash-fluid plugs alternated to air plugs at lower speed for each fluidic path 211, 213, 215 to be washed one fluidic path 211, 213, 215 at a time in alternate manner a variable number y of times for different fluidic paths 211, 213, 215 wherein y is larger for fluidic paths 211 with higher wash requirement and smaller for fluidic paths 213, 215 with smaller wash requirement. In particular, the number y of times is larger for the fluidic path 211 comprising a flow-through sensor path (due to its complex structure with sensory elements that may more easily retain residuals of a previous fluid) compared to the fluidic path 213 comprising a flow-through optical path 214 and to the bypass fluidic path 215. Also, the number y of times can be larger for the fluidic path 213 comprising the flow-through optical path 214 compared to the bypass fluidic path 215 (not shown).

FIG. 7 shows schematically further aspects of the method 100 of FIG. 2 that distinguish between different method steps 12, 33, 42 respectively, including pumping wash-fluid plugs alternated to air plugs. In particular, in the time-priority mode 10 the method 100 comprises pumping a larger number z of wash-fluid plugs alternated to air plugs than in the wash-fluid-priority mode 20.

Figure 8:
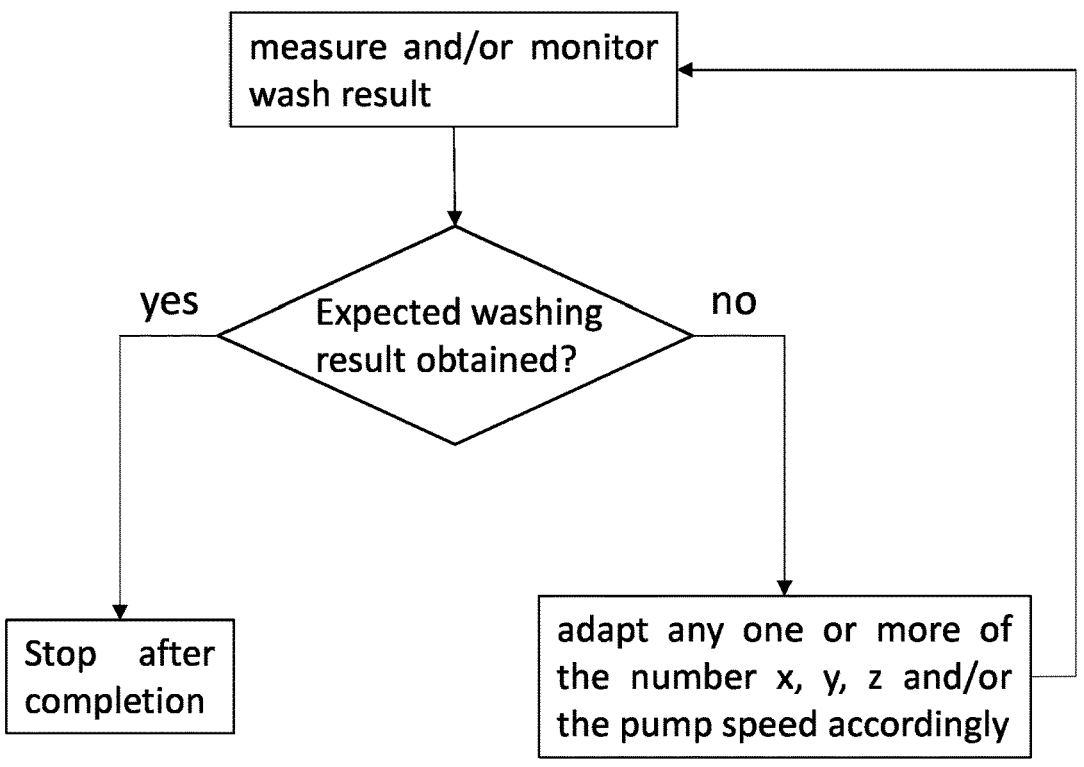
FIG. 8 shows schematically further aspects of the method of FIG. 2, FIG. 4, FIG. 6, FIG. 7 that can include possible adaptations of the method.

FIG. 8 shows schematically further aspects of the method 100 of FIG. 2, FIG. 4, FIG. 6, FIG. 7 that can include possible automatic adaptations of the method 100. In particular, the method comprises measuring and/or monitoring a wash result and adapting, eventually increasing, any one or more of the number x, y, z and/or the pump speed accordingly. The wash result can be measured and/or monitored, e.g. by analyzing the content of residuals of the previous fluid in the wash fluid 221 by the at least one flow-through detecting unit 211, 214 during the wash procedure. As soon as the expected wash result has been obtained, the method can be stopped, thus preventing to unnecessarily extend the wash time and/or increasing the fluid consumption.

Figure 9:
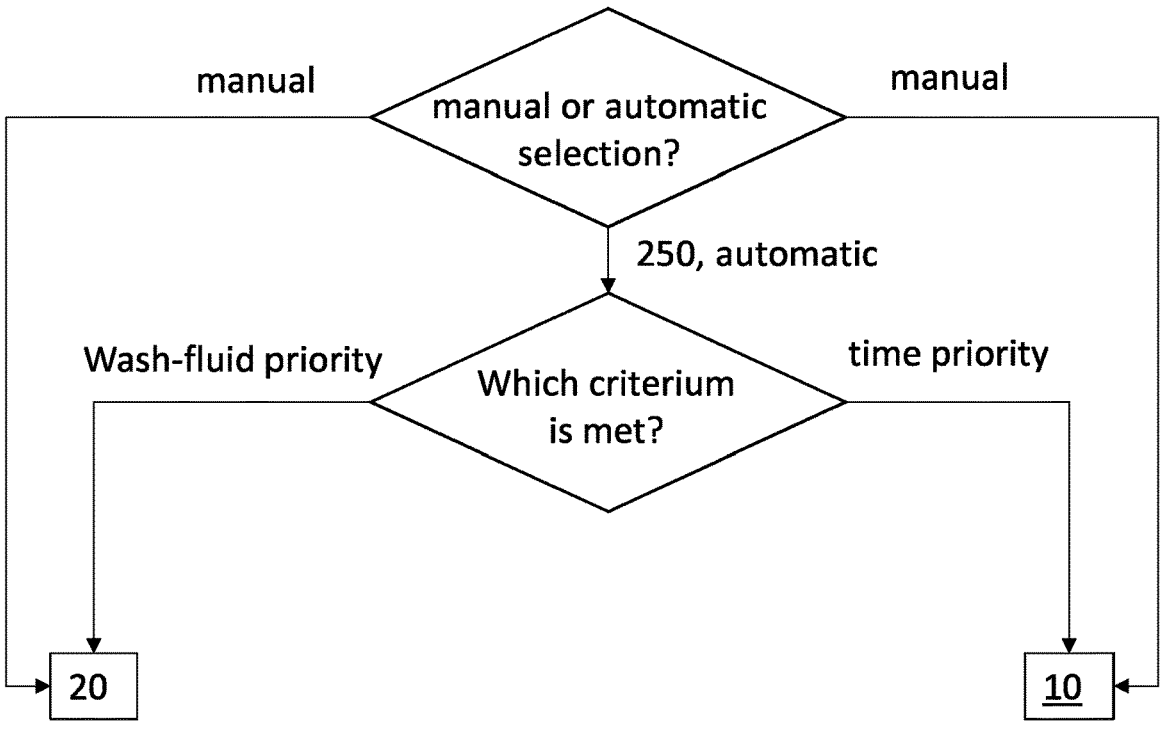
FIG. 9 shows schematically further aspects of the method of FIG. 2, including different ways of selecting the priority mode.

FIG. 9 shows schematically further aspects of the method 100 of FIG. 2, including different ways of selecting the time-priority mode 10 or the wash-fluid-priority mode 20. In particular, the time-priority mode 10 and the wash-fluid-priority mode 20 can be user-selectable or automatically selectable by the controller 250, based on any of a set of rules or criteria that prioritize either time or wash fluid.

Modifications and variations of the disclosed aspects are also certainly possible in light of the above description. It is therefore to be understood, that within the scope of the appended claims, the invention may be practiced otherwise than as specifically devised in the above examples.

Particularly, it is to be understood that at least some of the drawings or parts are only schematic and provided as way of example only. Also the relationship between elements may be other than the one shown, whereas parts not relevant for the purpose of this disclosure have been omitted.

Also, reference throughout the preceding specification to "one aspect", "an aspect", "one example" or "an example", "one embodiment" or "an embodiment" means that a particular feature, structure or characteristic described in connection with the aspect or example or embodiment is included in at least one aspect, example or embodiment. Thus, appearances of the phrases "in one aspect", "in one aspect", "one example" or "an example", "one embodiment" or "an embodiment", in various places throughout this specification are not necessarily all referring to the same aspect or example or embodiment.

Furthermore, the particular features, structures, or characteristics may be combined in any suitable combinations and/or sub-combinations in one or more aspects or examples or embodiments.

The invention claimed is:

1. An automated method of washing a fluidic system of an in-vitro diagnostic (IVD) analyzer from a previous fluid, the fluidic system comprising at least one fluidic path, the IVD analyzer further comprising at least one fluid-selection valve for selecting between fluids including a wash fluid and air, a pump and a controller configured to operate according to either a time-priority mode or a wash-fluid-priority mode, the method comprising controlling by the controller the pump and the at least one fluid-selection valve for pumping the wash fluid and/or air through the at least one fluidic path, wherein in the time-priority mode the method comprises pumping air at a first speed, in a first step, in order to remove the previous fluid from the at least one fluidic path, and pumping wash-fluid plugs alternated to air plugs such that consecutive wash-fluid plugs are separated by an air plug, in a second step, in order to wash out residuals of the previous fluid, and wherein in the wash-fluid-priority mode the controller is configured to operate according to either a sample-wash mode if the previous fluid is a sample or according to an other-fluid-wash mode if the previous fluid is any fluid other than a sample, wherein in the sample-wash mode the method comprises pumping air at a lower speed than the first speed, in a first step, in order to remove the previous fluid from the at least one fluidic path, pumping at least one wash-fluid plug at higher speed than the lower speed, in a second step, and pumping wash-fluid plugs alternated to air plugs such that the consecutive wash-fluid plugs are separated by the air plug at the lower speed, in a third step, in order to wash out residuals of the previous fluid, and wherein in the other-fluid-wash mode the method comprises pumping air at the lower speed, in a first step, in order to remove the previous fluid from the at least one fluidic path and pumping wash-fluid plugs alternated to air plugs such that the consecutive wash-fluid plugs are separated by the air plug at the lower speed, in a second step, in order to wash out residuals of the previous fluid.

2. The method according to claim 1, wherein in the sample-wash mode the step of pumping the at least one wash-fluid plug at the higher speed than the lower speed comprises switching the at least one fluid-selection valve in order to select the wash fluid, operating the pump to draw a volume of wash fluid corresponding to a wash-fluid plug into the fluidic system, closing the fluid-selection valve and operating the pump in order to generate an underpressure in the fluidic system before moving the wash-fluid-plug, and switching the fluid-selection valve to air in order to move the wash-fluid plug at the higher speed than the lower speed facilitated by the underpressure.

3. The method according to claim 1, comprising executing one pumping step in the time-priority mode, the sample-wash mode, and/or the other-fluid-wash mode for each of a plurality of fluidic paths to be washed one fluidic path at a time before initiating a different pumping step for each of the fluidic paths in the time-priority mode, the sample-wash mode, and/or the other-fluid-wash mode.

4. The method according to claim 1, wherein in the sample-wash mode the method comprises repeating the step of pumping the at least one wash-fluid plug at the higher speed than the lower speed a predetermined number of times.

5. The method according to claim 1, wherein in the wash-fluid-priority mode the method comprises repeating the step of pumping wash-fluid plugs alternated to air plugs such that the consecutive wash-fluid plugs are separated by the air plug at the lower speed for each of a plurality of fluidic paths to be washed one fluidic path at a time for a predetermined number of different fluidic paths.

6. The method according to claim 4, comprising measuring the pump speed.

* * * * *